July 26, 1932.    W. R. WALTERS    1,869,123
MOWING MECHANISM
Filed March 15, 1929    11 Sheets-Sheet 6

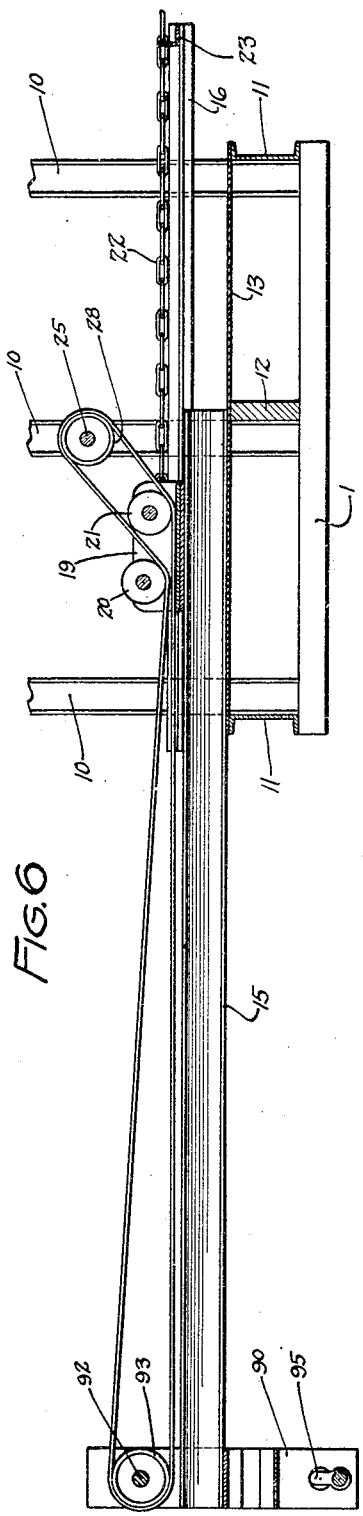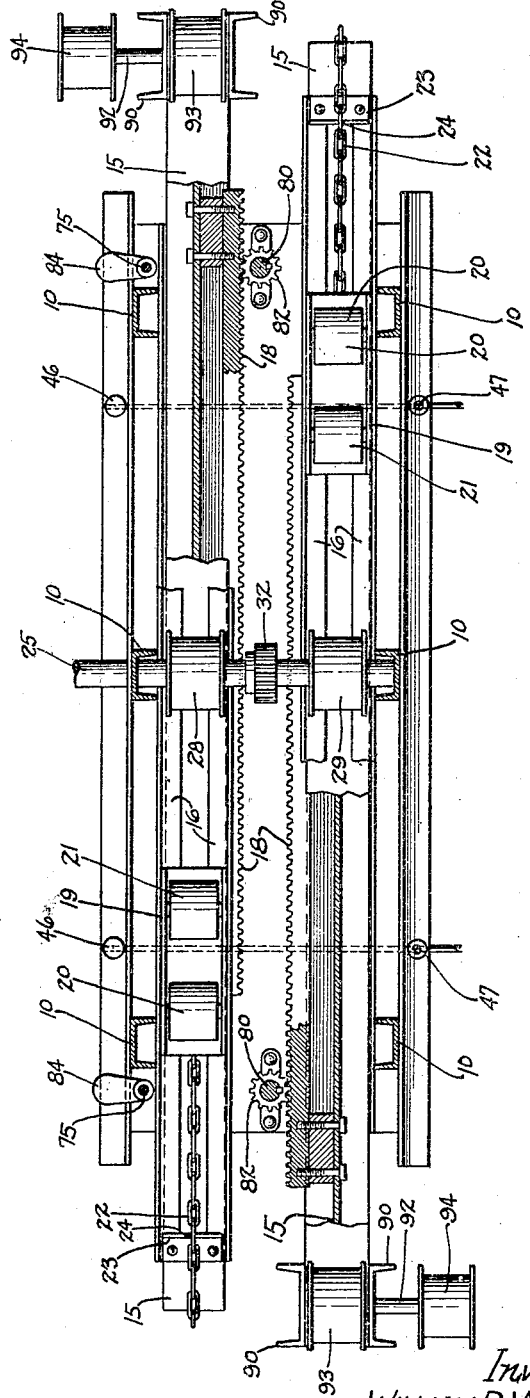

Inventor
WILLIAM R. WALTERS

ATTORNEYS

July 26, 1932.  W. R. WALTERS  1,869,123
MOWING MECHANISM
Filed March 15, 1929  11 Sheets-Sheet 7
FIG. 9
FIG. 8
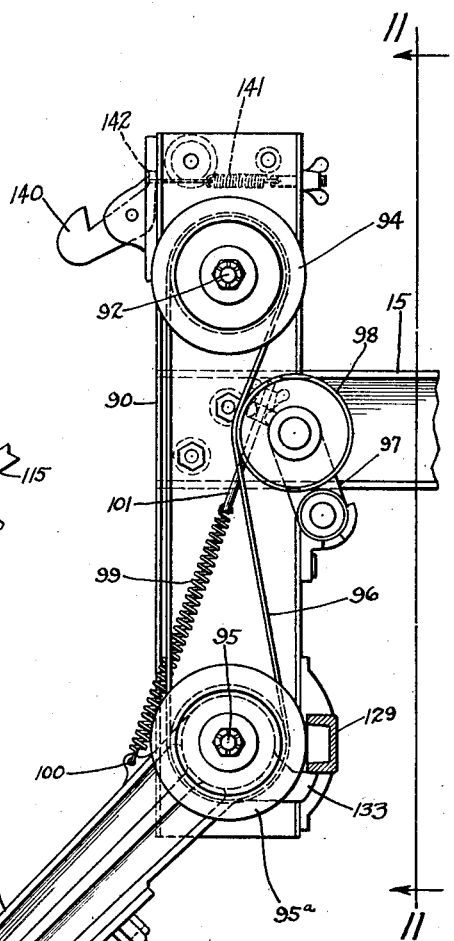
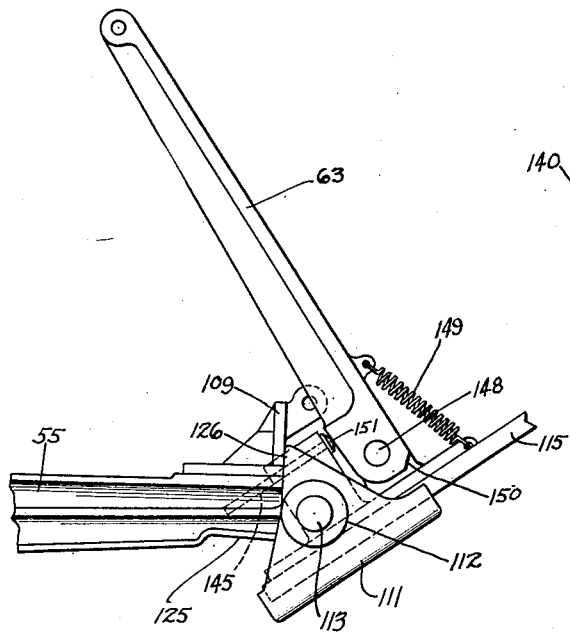
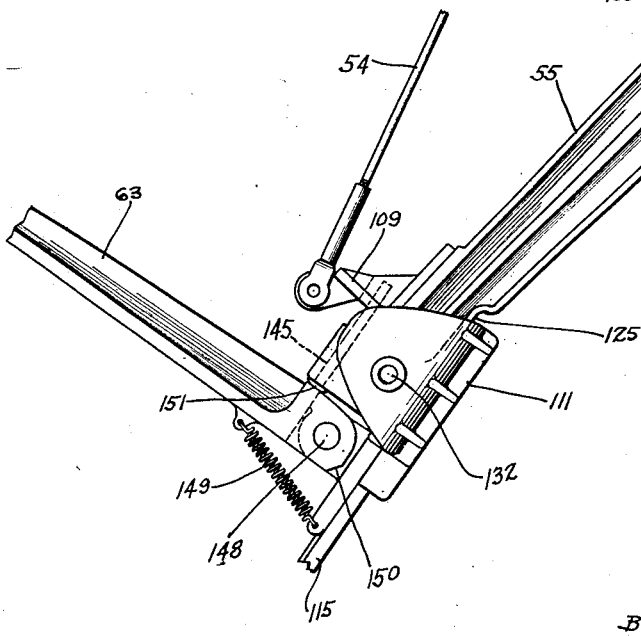
Inventor
WILLIAM R. WALTERS
ATTORNEYS July 26, 1932.  W. R. WALTERS  1,869,123
MOWING MECHANISM
Filed March 15, 1929   11 Sheets-Sheet 8
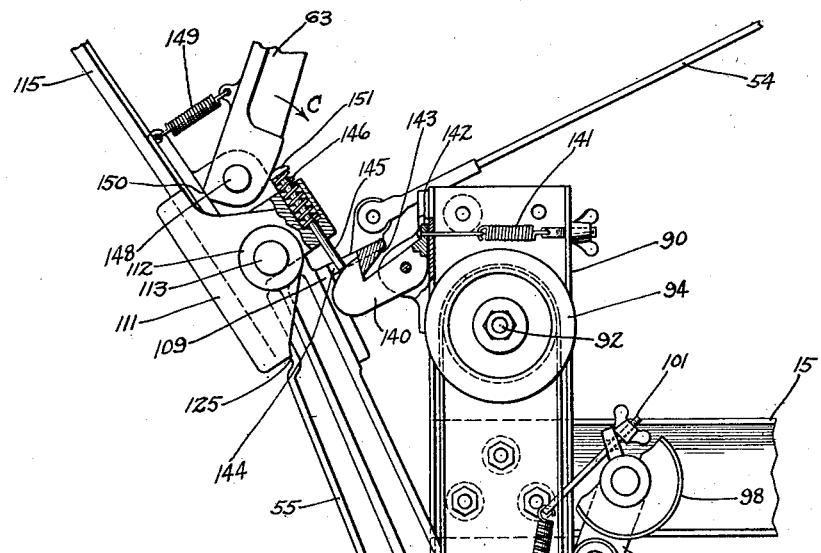
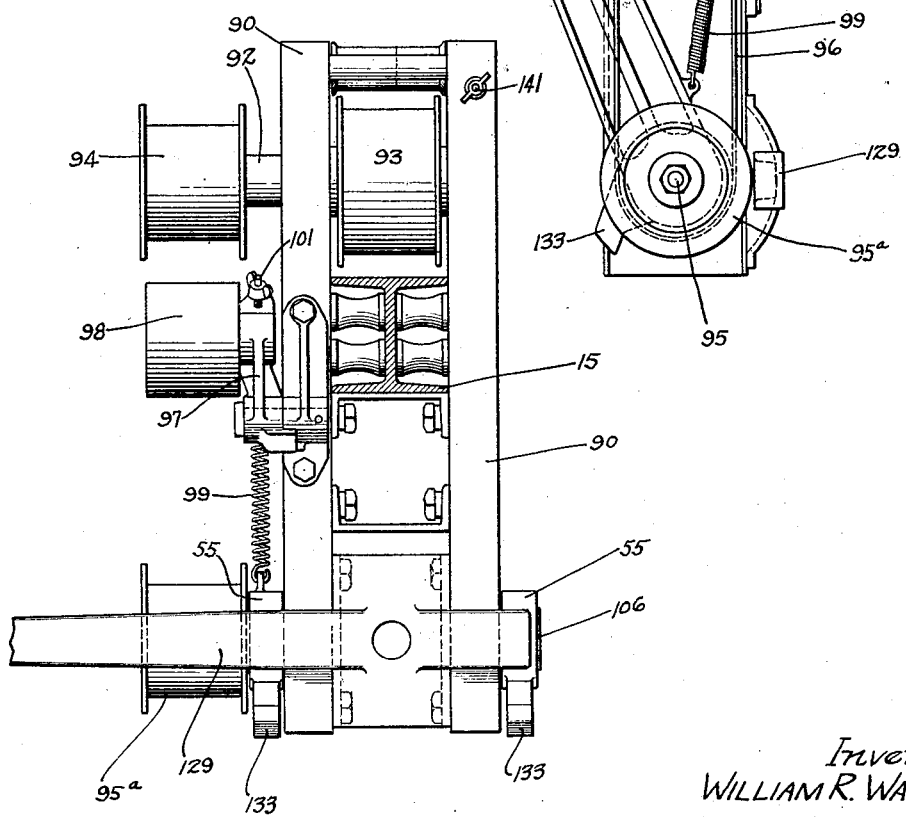
Inventor
WILLIAM R. WALTERS
ATTORNEYS

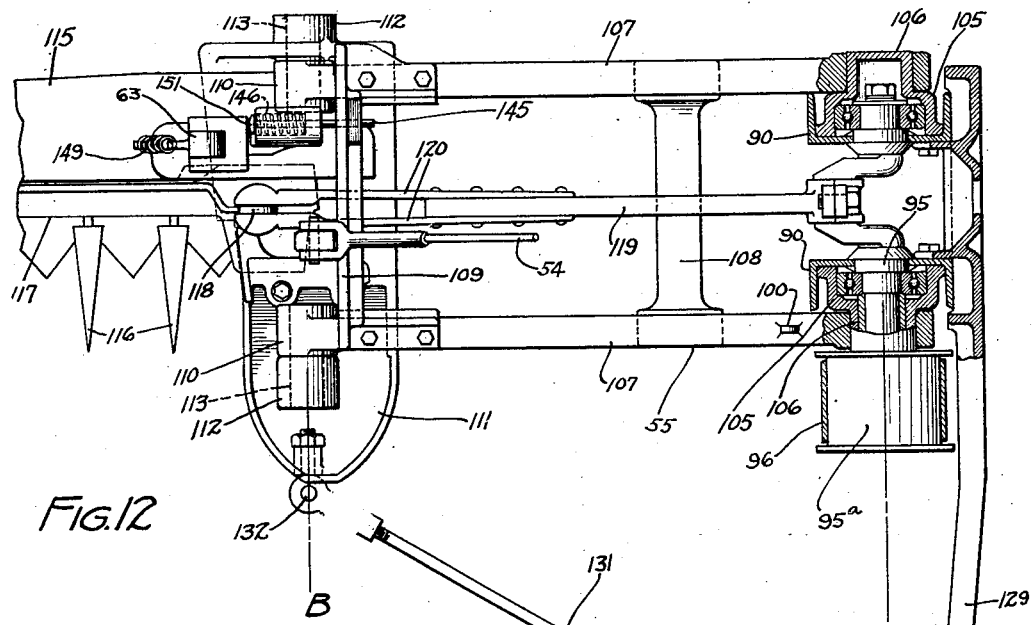
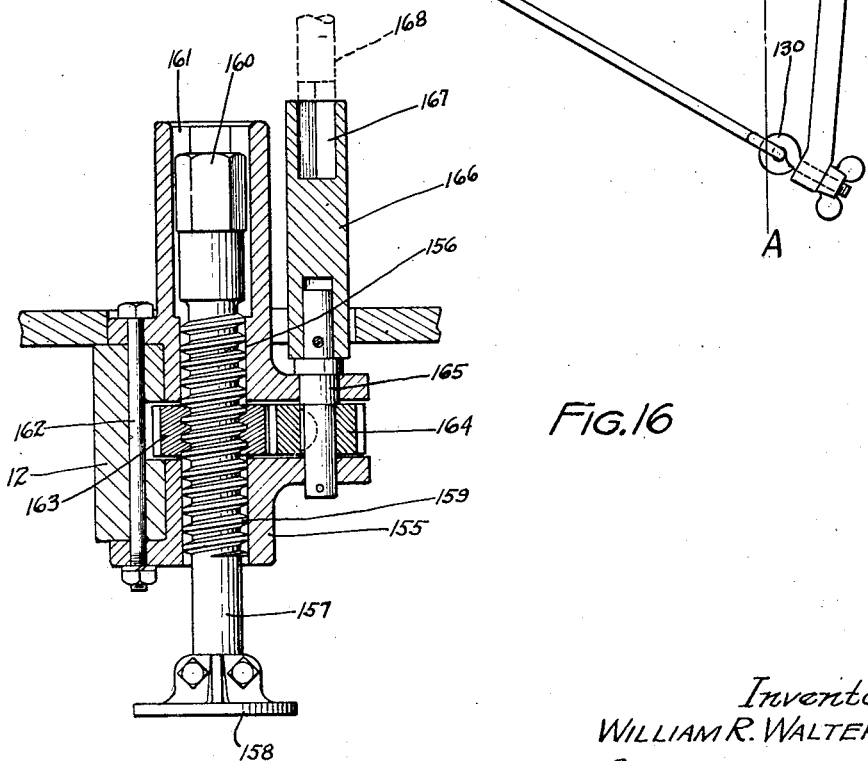

July 26, 1932.  W. R. WALTERS  1,869,123
MOWING MECHANISM
Filed March 15, 1929  11 Sheets-Sheet 10
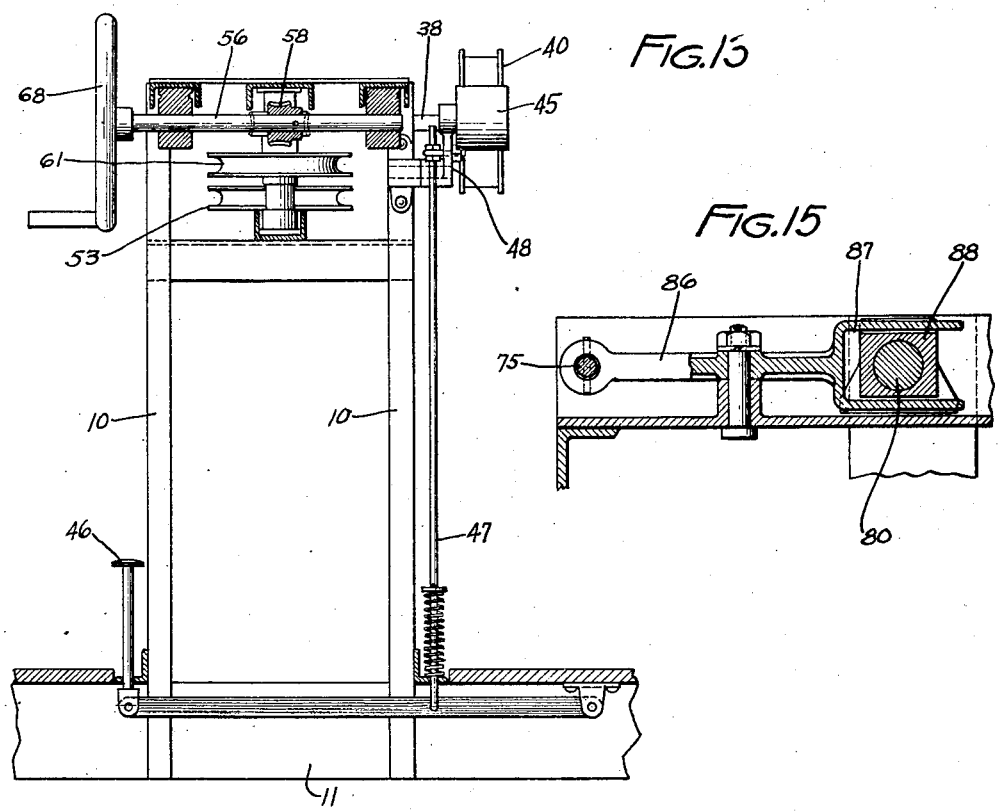
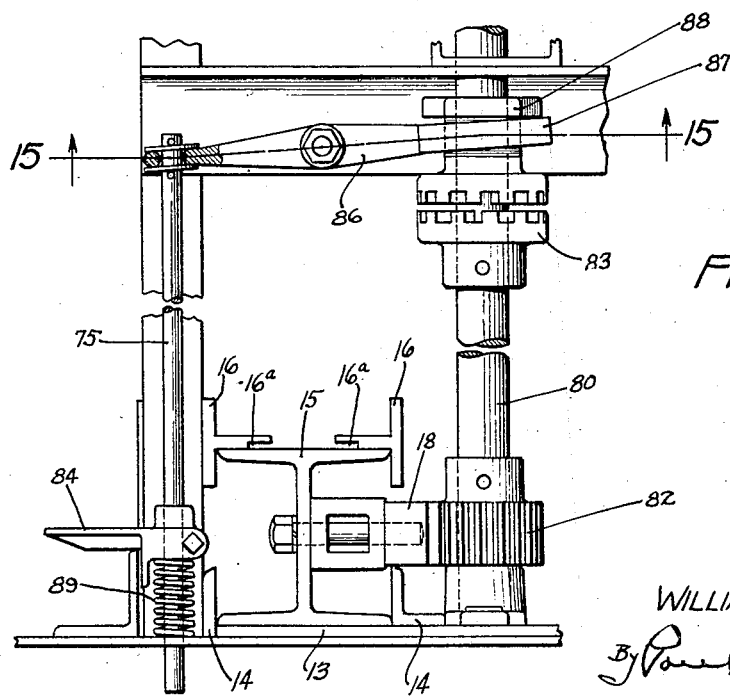
Inventor
WILLIAM R. WALTERS
ATTORNEYS

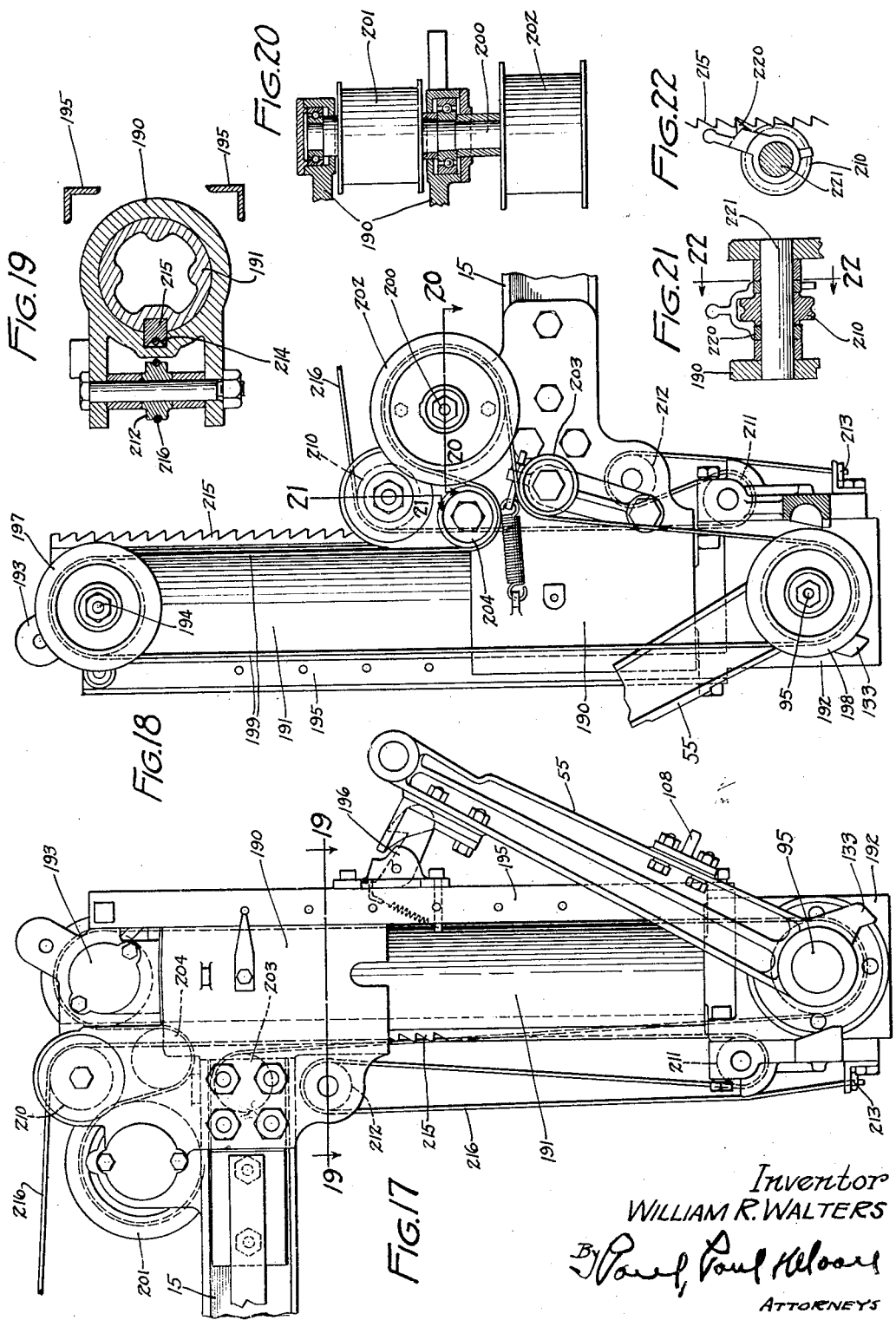

Patented July 26, 1932

1,869,123

UNITED STATES PATENT OFFICE

WILLIAM R. WALTERS, OF FAIRMONT, MINNESOTA, ASSIGNOR TO FAIRMONT RAILWAY MOTORS, INC., OF FAIRMONT, MINNESOTA, A CORPORATION OF MINNESOTA

MOWING MECHANISM

Application filed March 15, 1929. Serial No. 347,386.

This invention relates to improvements in mowing machines and particularly to a type of mower adapted for use for cutting weeds adjacent railway tracks, and mounted upon a trailer or equivalent device.

In devices of this kind it is desirable to have the cutter bars arranged to be raised and lowered, and to be tilted in conformity with the angle of the ground lying laterally of the tracks. It is also desirable to provide means to raise the sickles and sickle-carrying arms to avoid obstruction and to move the same horizontally inwardly or outwardly to clear obstructions, and also to fold or move to a position over the car when not in use. The present invention includes simple constructions, providing for all of the above mentioned operations.

Features of the invention include: cutting instrumentalities which can be moved laterally beyond the car and held in various adjusted positions; a belt drive for operating the cutting means; an arrangement of the belt drive permitting simple adjustment when the cutting instrumentalities are adjusted laterally; the sectional construction of the cutting means for increasing the range of adjustment; mounting of the cutting instrumentalities to obtain separate adjustment of different sections thereof; adjustment means controlled from a central point; arrangement of the belt driving means in a manner to freely permit adjustment of the separate jointed sections of the cutting instrumentalities; latch means for holding the sickles or cutters in raised position; manually and power-operable means for controlling adjustment of the jointed sections of the cutting instrumentalities in a vertical plane, stop means to prevent jamming of certain portions of the transmission connection for operating the sickle; the provision of separate units to wit: mowing and hauling units each self-driven, with means releasably connecting or coupling the units so that in case a cutting instrumentality meets with an obstruction before these elements can be moved to avoid the obstruction, the mowing and hauling units will be automatically disconnected without injury to or undue strain upon any portion of the mechanism; the provision of the brake means operable by either of two attendants when positioned to operate mowing instrumentality controls, also for obtaining uncoupling action when the obstruction is observed in time to carry out such an operation; the arrangement of control elements including pedal and manual and power operable devices in duplicate and the grouping in positions easily accessible by respective operators while positioned to control sickle operation and adjustment, including brake-operating pedals; means for raising the entire mower unit and obtaining a pivotal motion to place the cutters for operating by a movement of the unit in an opposite direction; and all details of construction including combinations and sub-combinations of the parts.

Other features and advantages will appear from the description of the drawings forming a part of this application and in said drawings Figure 1 is an end view, partly in illustration of the adjustability of the cutting elements;

Figure 5 is a plan section substantially on line 5—5 of Figure 4;

Figure 6 is a fragmentary section corresponding to Figure 4, but showing the head beam laterally extended substantially to its outer limit;

Figure 8 is a detail side elevation of the head, guide arm and portion of the cutter bar, showing the elements in their lowermost position;

Figure 9 is a detail view of the connection of the shoe with the guide arm, and showing the shoe engaging a portion of the arm as a stop to limit inward movement of the shoe;

Figure 10 is a view somewhat similar to Figure 8, but showing the parts in raised and latched position;

Figure 11 is a vertical sectional elevation on line 11—11 of Figure 8;

Figure 12 is a plan section illustrating the crank shaft and pitman connection, as well as the relation of the shoe to the guide arm;

Figure 13 is a vertical transverse section of the tower taken on line 13—13 of Figure 4;

Figure 14 is a side elevation more clearly illustrating the clutch for the beam adjusting shaft;

Figure 15 is a reverse plan section on line 15—15 of Figure 14;

Figure 16 is a detail vertical section on line 16—16 of Figure 3;

Figure 17 shows a side elevation of a vertically adjustable head and head adjusting mechanism;

Figure 18 is a reverse view of Figure 17;

Figure 19 is a section on line 19—19 of Figure 17;

Figure 20 is a section on line 20—20 of Figure 18;

Figure 21 is a section on line 21—21 of Figure 18; and

Figure 22 is a section on line 22—22 of Figure 21.

Figure 1:
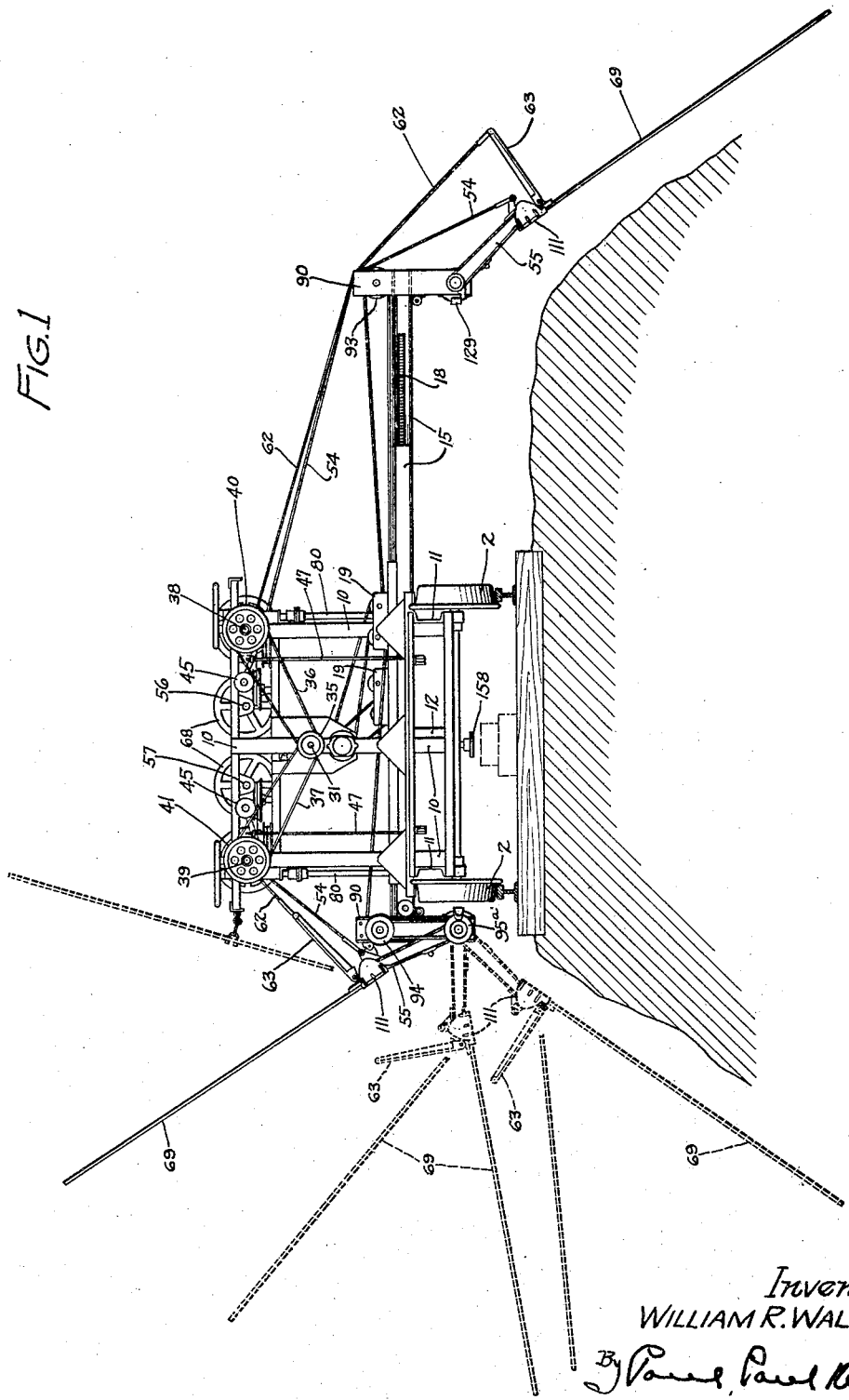

The truck is formed of steel side sills 11 as channel irons, an intermediate wooden sill 12, cross members 1. The truck body is suitably connected to the wheels 2, but inasmuch as this connection forms no part of the present invention the detail is not shown or described.

Each wheel is provided with a brake shoe 3 (see Figure 3) and the brakes are operated from a common shaft 4, the shaft being controlled by two pedals 5 so that each operator can separately control the braking. Suitable connections 6, 7, 8, 9 are provided between the element 4 and the shoes 3. The ensemble constitutes the braking means of the claims.

Control tower

The structure provided for supporting means for separately controlling each cutting instrumentality is herein referred to as the control tower, and has mechanisms respectively for controlling adjustment of all cutting devices laterally inwardly and outwardly with respect to the car, for raising and lowering the guide arms and sickle bars, and adjusting these elements for their various cutting positions, as well as bringing them to inactive and/or storage positions.

Figure 7:
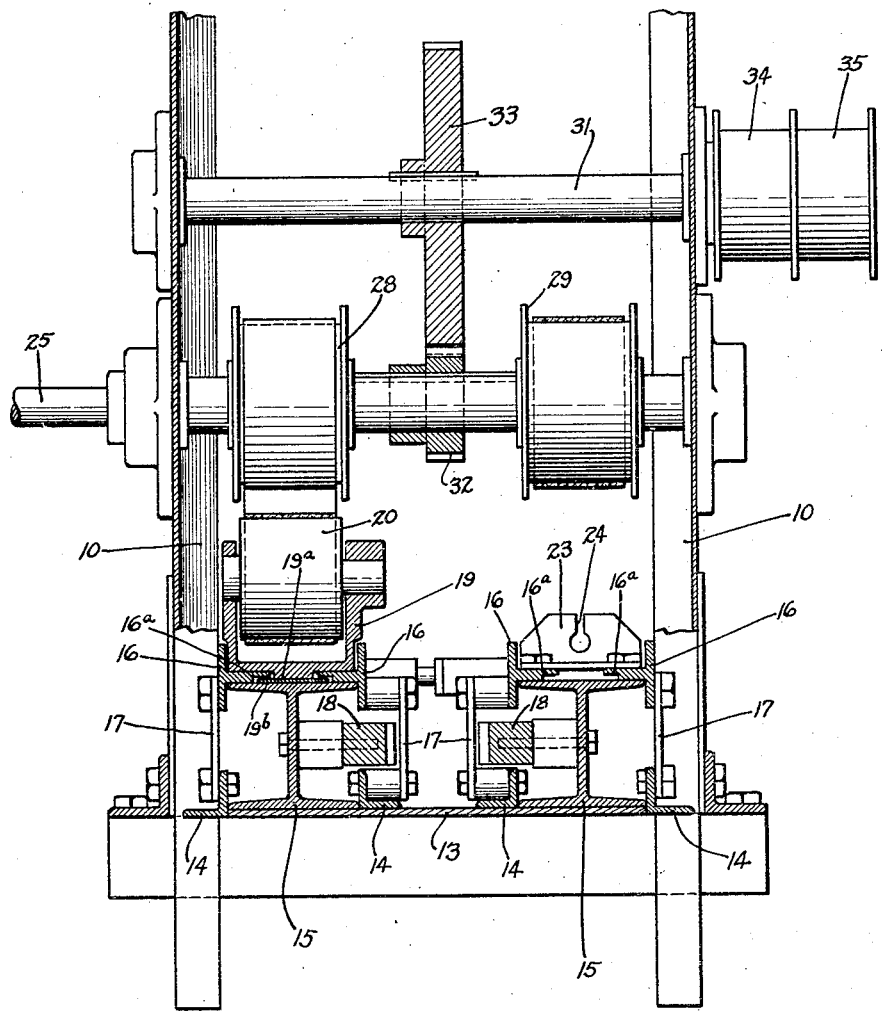
Figure 7 is a transverse section through the tower, but longitudinally of the car.

The tower (see Figures 5, 6, 7) is formed of vertical elements 10, and members bolted to the steel and wooden main sills of the car, respectively designated 11, 12. Steel base plates 13 are provided, to which are bolted irons 14 (see Figure 7) forming guides for the head beams 15 formed from H-beams. The top guides 16 of these beams are bolted to the vertical channels 10 and are clipped as at 17 to bottom guides, and each beam is provided with a rack 18. The top guides 16 also serve as a track or guide on which idler boxes 19 slide.

The guide irons 14 and 16 are thus related as the corners of a rectangle to provide a kind of boxing for the beams 15. The irons 16 are under-cut as at 16$^a$ and the box 19 has a central extension 19$^a$ which projects downwardly between the horizontal flanges of the T-irons 16. To this extension is secured a plate 19$^b$ which cooperates with the flanges at their notched portions 16$^a$ to prevent lifting of the box due to the upward pull of the belt. The boxes 19 are to be considered as slidably guided and it will be noted that the boxes may partake of the translative motion of the element 15. Both elements 15 and 19 can be separately moved or they may be caused to move together. Particularly the box 19 may move when the extension 15 is translated.

Each idler box has two idler pulleys, respectively 20, 21, and each box is provided with a chain 22 as means for adjusting and securing the box in adjusted position. An angle iron 23 is provided and is located at the outer end of each top guide and this iron is notched as at 24 to receive the chain in a manner to anchor the idler box in any position on the guide, see Figures 4 and 6.

There is no intention to be limited to the idler construction per se inasmuch as the gist of the invention is the provision of a head which is slidably adjustable transversely of and laterally of and beyond the car, along with adjustable driving means, whatever the specific construction. Nevertheless the belt driven assembly is also specifically claimed.

The propeller shaft 25 is arranged upon the center vertical channels at a level above the idler boxes and this shaft is directly connected with the engine 26 through a suitable coupling. This shaft has keyed thereto two main belt drive pulleys 28, 29 located between the vertical elements of the tower. Above the propeller shaft is located a counter-shaft 31 which has a constant gear drive connection as at 32, 33, with the propeller shaft. This counter shaft has two pulleys 34, 35, arranged on the forward side of the center vertical channel, and these pulleys are connected by belts 36, 37, respectively to worm shafts 38, 39, through pulleys 40, 41. The shafts control adjustment of the main guide arms. The belts just mentioned are normally slack and an idler 45 engages each belt, and each idler is controlled by a foot pedal 46 (see Figure 13) pivoted as shown and having a link 47 connecting with the idler arm 48 so that foot pressure throws the idler against the belt to tighten it and operate the corresponding worm shaft. Each shaft is geared as at 50, 51 (see Figure 4) to the cable drum shaft 52 having the drum 53, and cable 54 attached to the guide arm 55 as shown.

The sickles are separately controlled only manually, as distinguished from the power and manual control of the guide arms 55. To this end, horizontal shafts are provided generally corresponding to the shafts 38—39 and these shafts are respectively designated 56—57 and are geared as at 58—59 to vertical shafts 60 corresponding to the shafts 52. Each shaft 60 has a drum 61 and each drum is connected by a corresponding cable 62 to a corresponding sickle control arm 63. Shafts 38—39 are respectively provided with hand wheels 67 while each shaft 56—57 is provided with a hand wheel 68.

It will be understood that the shafts 38—39 can be controlled both manually and by motor power, but that the shafts 56—57 are only manually controlled. This, for the reason that the power control is for raising the arms 55 quickly to avoid an obstruction, while the manual controls are for making close adjustments of the cutting instrumentalities. It is evident that when the arm 55 is raised the sickles generally designated 69 are also raised. It will also be evident that after the arm 55 is properly angularly adjusted it is sometimes necessary to adjust the sickles 69 independently or separately, and with the present device this can be accomplished.

Figure 4:
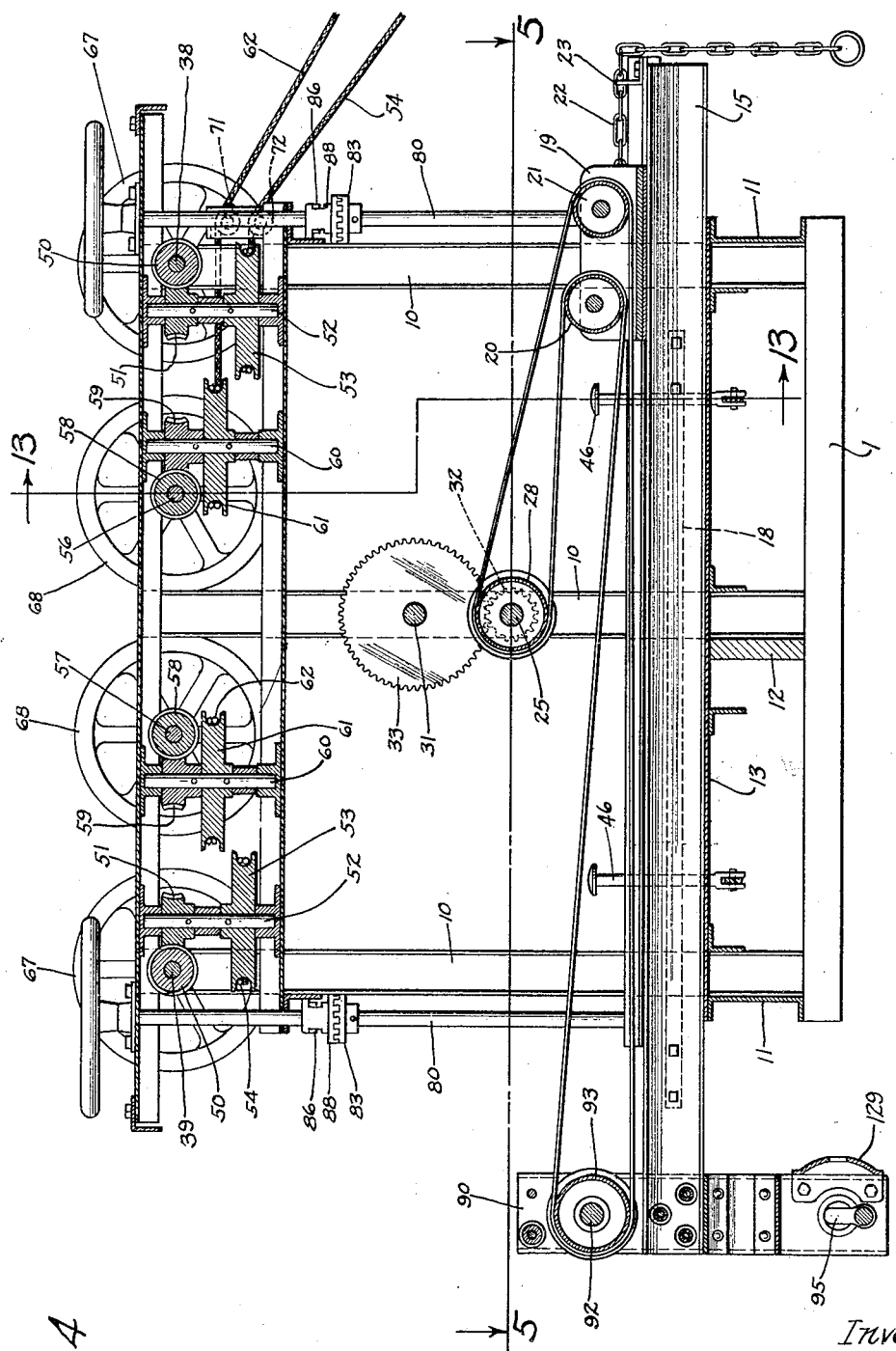
Figure 4 is a vertical longitudinal section through the tower, but transversely of the car.

The cables are respectively guided, upon the tower structure, by rollers 71, 72, see Figure 4.

There are four cable drums in all mounted on four shafts as best shown in Figure 4. Each shaft is provided with a gear which is driven by a worm mounted on a horizontal shaft and each of these horizontal shafts extends rearwardly of the control tower and is provided with a hand wheel. Two of these shafts also extend forwardly of the control tower and equipped with the pulleys previously mentioned for separate power control of the guide arms. The cable drums have the cables, two cables to the right and two to the left, the duo-controlled cables connecting with the main guide arms, and the mono-controlled cables connecting with the tilt arms as shown. Thus the guide arm and sickle can be separately raised, lowered, and adjusted.

The device, therefore, provides means, in this case pedal-controllable by either attendant independently, to rapidly raise the entire cutting apparatus to avoid an obstruction. Two controls are provided for the cutting apparatus, one for initially adjusting the cutting instrumentalities to correspond to the slope of the grade, and the other for quickly raising the cutting instrumentalities for the purpose of avoiding obstructions.

The first adjusting means are operable only through worm shaft drives and the latter, in addition, through belt drives, in which the tensioning of the belts to obtain the quick lifting action is controlled by means of foot levers.

At each side of the control tower is located a vertical shaft 80 (see Figures 4, 7, 14 and 15) having bearings in the tower structure. Each shaft is fitted with a hand wheel at the top. The shaft is provided at its lower end with a gear 82, see Figure 14, which meshes with a rack 18 of the corresponding extension arm or head beam 15. Each shaft is provided with a fixed clutch element 83 and a movable clutch element 88 controlled by a foot pedal 84 operating a rod 75 in turn controlling a lever 86, the said lever being forked as at 87 (see Figure 15) said fork engaging the squared portion of a movable clutch element 88. The rotation of this element 88 is prevented as the result of the cooperative relation of its squared portion with the adjacent angle frame member. When the teeth of the clutch are in mesh the shaft is held stationary and this is the condition during the normal operation of the machine. When it is desired to adjust the head-carrying element laterally, the pedal 84 is depressed against the action of spring 89 and the clutch is raised as shown in Figure 14. The shaft is then turned by means of the hand wheel.

*Head*

Certain important features of the invention are best illustrated in Figures 8 to 12, inclusive, to wit: the power head, the guide arm, the sickle, appliances for driving the sickle, and means for raising and lowering the guide arm and sickle and for limiting and controlling the movements of these latter elements.

Only the description of one of the devices will be made inasmuch as the construction is substantially the same for both sides. As before stated, the main extension element 15 is formed from an H-beam, and is arranged to slide transversely of the car, and to be extended a substantial distance laterally beyond the car, when desired.

The main extension element is provided with a power head formed by securing two channel irons 90 at opposite sides of the H-beam as best shown in Figure 11. These channels are suitably braced to form the head. Referring to Figure 11 which is a section on line 11—11 of Figure 8.

Journaled in the head above the extension shift beam 15, is a shaft 92 upon which are two pulleys, one designated 93, lying between the elements 90 and the other, 94, at the outside of the elements. Journaled also crosswise in the head and also on an axis parallel with the side of the car is a crank shaft 95, see Figure 12, having an extension at the side of the head, and on the same side as pulley 94, and in the same vertical plane therewith. Upon this extension is a pulley 95ª. The pulleys 94, 95ª are connected by a belt 96, and the pulley which lies between the frame elements of the head is connected in a manner later to be described with the power. Referring now to Figure 1, it will be seen that the crank pitman lies at a level adjacent the track, and at a point as near the ties as possible. Moreover, the head can be shifted to a position immediately adjacent the side of the car (see Figure 1) to dispose the cutters for operating on a grade whose crown is immediately adjacent the ties. The belt 96 transfers power at the outside of the head to the crank pulley 95ª, and the tension on the belt is maintained by means of a belt tightener. This belt tightener comprises an arm 97 pivoted as shown and having a pulley 98. The pulley engages the belt at the outside and is maintained in engagement by means of a spring 99 (see Figures 8 and 11) connecting with the guide arm 55 as at 100 and with a bolt 101 passing through a lug on the pulley arm. A nut in threaded engagement with the bolt provides means for adjusting the tension of the spring. The belt-tensioning means (any suitable means) is so arranged that when the guide arm is raised the tension on the spring is decreased until, as the guide arm approaches its uppermost position, the tension is sufficiently released to automatically cut off power to the crank pulley as the result of slippage of the belt. This is a valuable feature of the invention.

*Power transmission*

The manner of transmitting power from the main drive shaft 25 to the head is most clearly shown in Figure 4, and is a very important feature of the invention because of its simplicity and because the adjustment can be made while the engine is running. The belt tension, after adjustment or during adjustment, is controlled by the idler box 19, and the movement of the beam 15 is controlled by means of the manually operable shaft and the gear and rack connection between the shaft and the beam. A belt is used, and after being looped over the drive pulley 28, the runs pass respectively over the tops of corresponding pulleys 20, 21 of the idler box, and then beneath these pulleys outwardly to the upper drum 93 of the head. The two extreme adjusted positions of the beam and idler box are respectively shown in Figures 4 and 6. This arrangement is a very important feature of the invention and is broadly claimed as a sub-combination.

Figure 1 well illustrates the manner in which each head can be separately adjusted to meet varying conditions of slope, and distance of crown of slope from the end of the ties. At the left of the figure, the crown is adjacent the ties, while at the right it is at a greater distance therefrom. The ability to angularly adjust both the guide arm and sickle is also a valuable feature of the invention, particularly in combination with the ability to laterally adjust the head-carrying elements while at all times maintaining the driving connection.

*Main guide arm*

Referring to the top plan view, Figure 12, the bearing boxes 105 for the crank shaft 95 are provided with extensions 106, which form pivots or bearings for the elements 107 which form the guide arm. The side elements 107 are connected at an intermediate point by a cross brace 108 and terminally connected by another cross brace 109, as a yoke by which adjustment of the arm is controlled through a cable. The end of each element 107 is provided with a bearing 110, these bearings being aligned in direction of the travel of the car.

A shoe 111 is provided with lugs 112 as bearings which are connected with the bearings 110 of the guide arm by means of suitable stub shafts 113 as shown. Thus the shoe is pivotally mounted. The shoe carries the sickle including the base bar 115, usual fingers 116, and movable blade 117. There is no intention to be limited to the form of sickle.

The sickle can be of any preferred construction and therefore its specific construction is not important except that it provides cutting instrumentalities and that it is mounted on the shoe, and that the shoe in turn is pivotally connected with the guide arm. The movable blade 117 is suitably guided and has a ball 118 as one element of a ball and socket joint. The pitman 119 is connected with the crank shaft 95 and has adjustable spring arms 120 providing the other element of the ball and socket joint. The ball is so disposed with respect to the pivotal point of the shoe with the guide arm, that adjustments of the shoe and therefore of the sickle can be made without interfering with the pitman connection or without interference by this connection, for all positions of the crank.

The rotation of the shoe is limited in each direction. The rear section of the shoe engages the guide arm at 125 on the under side to limit downward movement at about ten degrees beyond the center line of the guide arm, see Figure 9. The top portion 126 of the shoe engages the face of the yoke 109 (see Figure 9), when the sickle bar and shoe are tilted to a point approximately forty degrees above the center line of the guide arm. This limit of upward movement prevents the sickle from coming in contact with the control tower (see Figure 1) and prevents injury to the pitman and connections therefor.

The shoe forms a base for the sickle as a whole including the sickle tilting arm 63. The guard bar forms support and guide for the knife and is provided with three guard runners 127 to properly maintain the level of the guard bar and the sickle above the ground line, and thus prevent digging of the sickle into the ground.

A brace 129 (see Figure 12) is provided at the bottom of the head, and this brace extends forwardly of the guide arm and is provided terminally with an eye-bolt 130, the center of the eye of which lies on line A, as an extension of the axis of the crank 95. A link 131 connects this eye with the forward side of the shoe at 132, this connecting point lying on line B as an extension of the pivotal axis of the shoe with the guide arm. This brace relieves the strain on the guide arm, and, due to the arrangement of the pivotal connecting points, the adjusting movements of the shoe and sickle are not interfered with, nor are the adjusting movements of the arm with respect to its pivotal point on the bearing extensions of the crank shaft interfered with. The arm 129 also acts as a brace at the lower end of the head, and also as a stop for limiting the downward movement of the guide arm, one element of said arm being provided with a stop extension 133 (see Figure 8) which engages said brace arm.

Guide arm latch

Latch means is also provided for holding the guide arm 55 and cutter 115 in raised position adjacent the head as shown in Figures 1 and 10. The movement of the guide arm is controlled independently, as is the lateral adjustment of the head beam. The object of this latching device is to hold the arm in inoperative position. A latch element 140 is pivoted at the top of the head as best shown in Figure 10 and is urged to latching position, by means of a coil spring 141, the tension of which can be adjusted. The upward movement of the latch is limited by engagement of an extension 142 against the head. The terminal connecting member 109 is beveled as at 143 to engage the latch and depress it as the arm reaches its upper latching position, and this element 109 also has an opening 144 the wall of which forms one of the latch elements. Upon the yoke (which is movable with respect to the guide arm) is slidably mounted a trip pin 145 having a spring 146 acting normally to move the pin in a direction away from the latch.

The tilting arm 63 for changing the angle of the sickle is pivoted as shown at 148 to move the shoe. A coil spring 149 normally tends to hold this tilting arm in the position shown in Figure 10, its movement being limited by a stop 150 engageable with the cutter base or with the shoe. When power is applied to this arm, through cable 62, it is moved to the position shown in Figures 8 and 9, its movement in that direction being limited by the head 151 of the trip pin, which head engages its support to limit its own movement toward the latch as shown. Whenever the trip arm is moved in the direction of the arrow C in Figure 10, the latch will be tripped and the guide arm released. Therefore, when it is desired to release the latch to permit the guide arm to move downwardly to working position, the cable 62 is pulled, causing the arm to push the pin against the latch and release it.

After the latch is released, the arm 63 is held in latching position until the guide arm 55 is lowered sufficiently to prevent relatching. All of these operations are controlled from the tower.

Jack

This means for turning the car to position the cutting elements for cutting by movement of the car in an opposite direction, is an important feature of the invention. Although the means hereafter described are specifically claimed, there is no intention to be limited entirely to such means, the broad feature of the invention being the provision of pivot means carried by the car (as a support for the mower or cutting unit) which can be engaged with the ground to elevate the unit and permit it to be swung.

Figure 3:
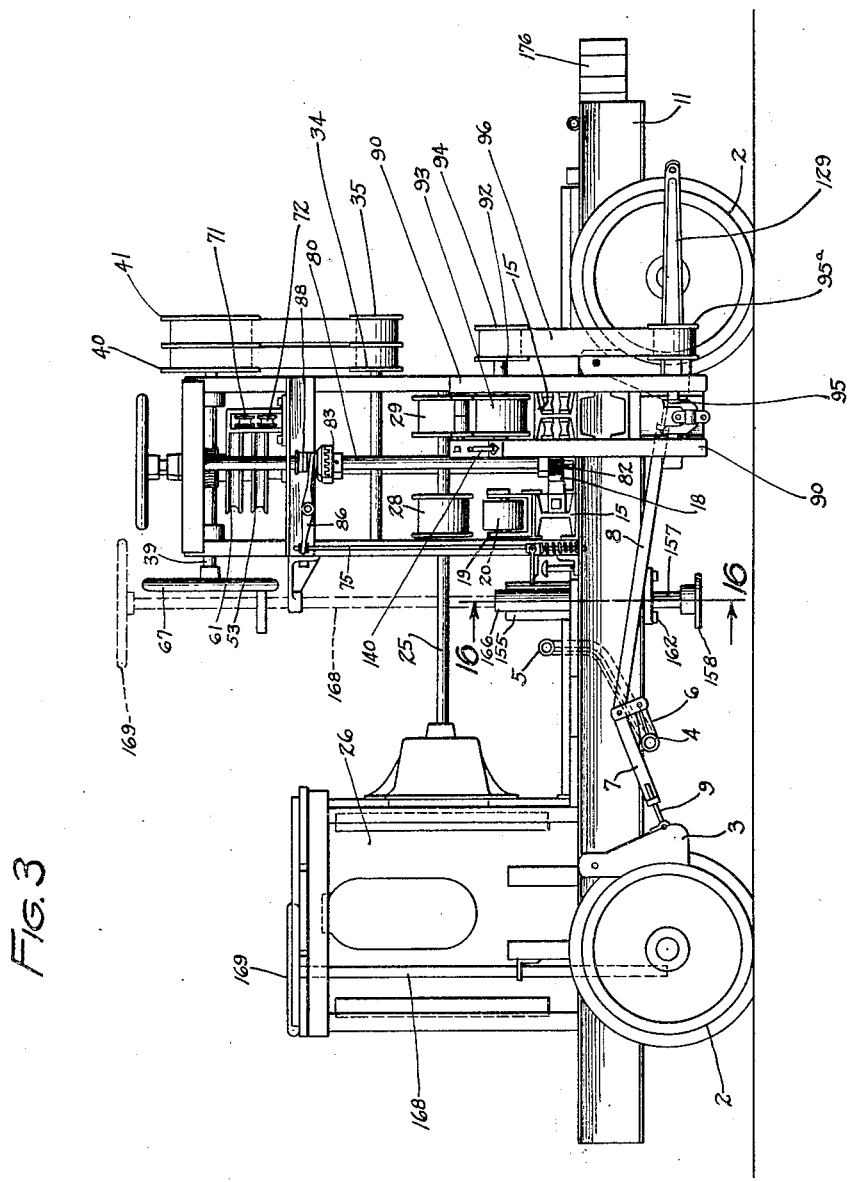
Figure 3 is a side elevation with the belts and cables omitted, as well as the guide arm and sickle.

Referring first to Figure 1. A center beam 12 is provided on the car laterally of and to which (see Figure 16) is connected a casing 155 having a vertical bore 156 to receive a foot 157 which has a terminal ground-engaging piece 158. This foot has the form of a shaft slidable in the bore, and is screw-threaded as at 159. At the top the shaft is provided with a polygonal faced portion 160 which fits a correspondingly faced portion 161 of the bore 156, to prevent rotation but permit sliding movement of the shaft or foot. Of course, a splined connection between the elements would accomplish the same purpose. The casing is secured by means of a bolt 162 to the central beam. The casing is formed to receive driving gear elements one, 163, of which is in threaded engagement with the threads 159 of the foot. The other gear 164 is keyed to a separate shaft 165, journaled in the casing. This latter shaft extends upwardly and is provided with a coupling 166, in turn having a squared socket 167 at its upper end, to receive the correspondingly squared portion of a shaft 168 having an operating wheel 169 at its top, see dotted lines in Figure 3. It will be seen that by rotating the shaft, the gear nut cooperating with the threads of the leg and with the casing 155 will cause the car to be raised. After raising, the car is manually turned through an angle of one hundred eighty degrees, thus conditioning the apparatus for cutting in an opposite direction. When not in use the operating element 168 is stored as best shown in Figure 3. This is a very simple and effective device for the purpose in hand and it is claimed broadly as well as specifically.

The use of jacks is well known but the use of a jack for raising a railway weed cutting unit, to dispose the railway car and the cutting instrumentalities for operation by movement in an opposite direction, constitutes a valuable feature of the present invention.

This appliance is an important feature of the invention because the whole device can be turned to dispose the cutters for cutting by a movement in the opposite direction, without running to a switch.

*Automatically detachable mower and hauling units*

A valuable feature of the invention includes two separate units, towit: a mowing unit and a hauling unit, both self-driven, the said units being releasably coupled so that in case a cutter of the mower unit meets with an obstruction, before the attendant can raise the cutter, the mowing and hauling units will be disconnected without injury to any of the mowing mechanism. Another feature separate or included with the above mentioned feature is the provision of dual-controllable brake mechanism which is operable by either attendant (while stationed to control the mowing instrumentalities) for causing the mowing unit to be uncoupled from the hauling unit, when an obstruction is not observed in time to operate the power and/or manually controlled cutter-raising devices, to clear the obstruction. The braking means is operable by either operator for causing an uncoupling. Any form of braking mechanism separately operable by each attendant while positioned to control the cutting means, can be used.

Figure 2:
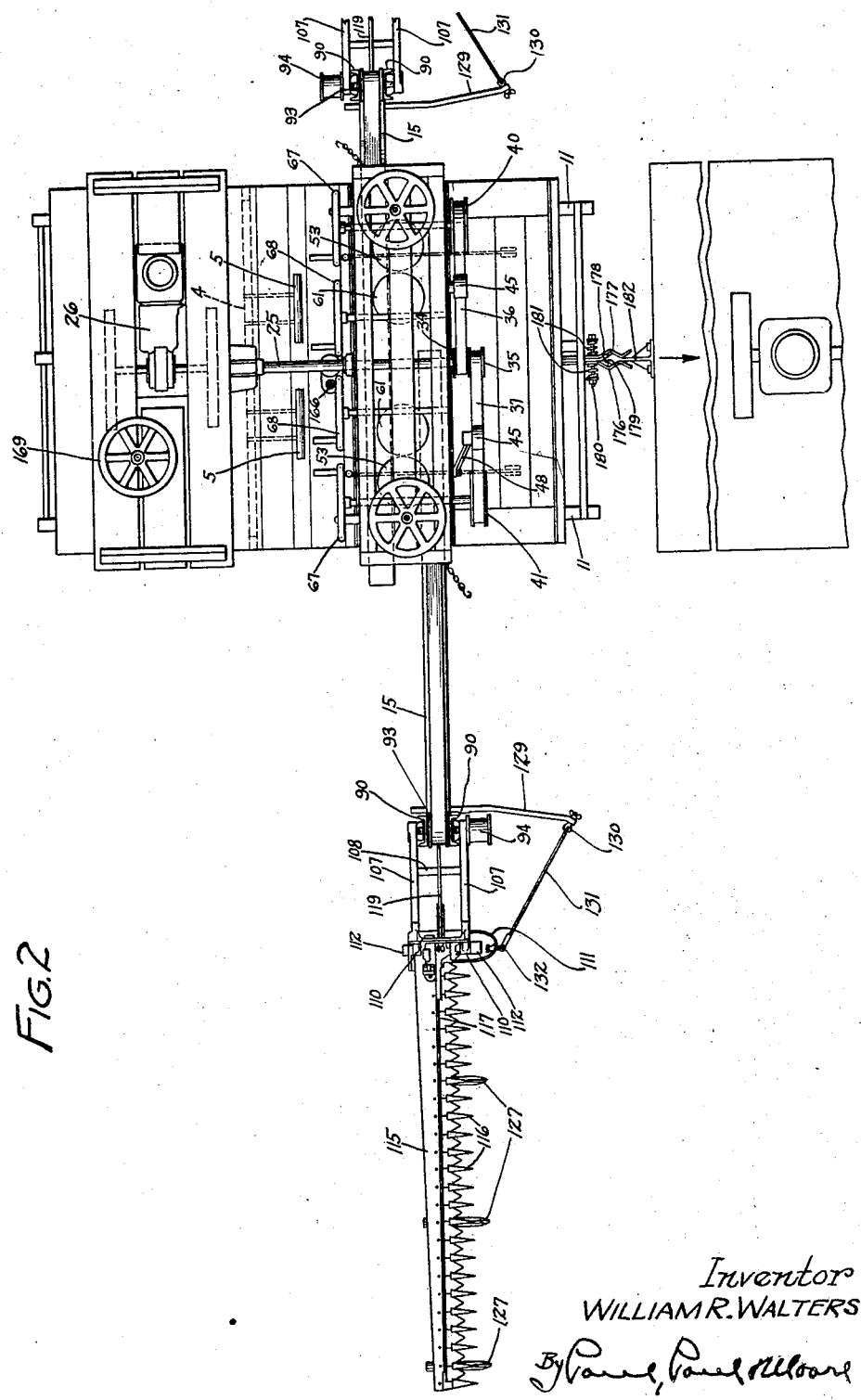
Figure 2 is a top plan view, certain of the mechanism being omitted for the sake of clarity.

To the platform of the mowing unit is secured by means of the centrally longitudinally arranged beam 12, one element of the coupler, see Figure 2. This element is composed of two spring members 176, 177, laid against the outer side of a base member 178, having its ends forked as at 179 to engage and limit the spring members in the relation shown. A bolt 180 passes through the three elements, and has springs 181 tensioned to engage and press the spring elements against the base member 178. A throat is thus formed to receive the head 182 of the other member of the coupler. This member is secured to the hauling unit, and is formed from malleable iron, or other suitable material. The construction of the coupler per se is not claimed in this application but is claimed in my copending application filed April 29, 1929, Serial Number 359,084. The self-contained mower unit is detachably coupled to a self-contained pulling unit, so that if either mowing instrumentality engage an obstruction, the mowing mechanism will not be injured as a result of continued forced entrainment of said mechanism by the hauling unit.

The tension of one of the coupling elements can be varied and this tension is adjusted so that uncoupling will take place before the strain is sufficient to injure the cutting instrumentalities. The present invention, therefore, provides means for protecting the mechanism against undue strain, said means being automatically operable, and foot and hand controllable.

The cutting mechanisms are made in "rights" and "lefts", necessitated by the fact that the cutter teeth must face in the same direction, at opposite sides of the car.

The raising and lowering of the cutter bar and the tilting thereof is accomplished by two hand wheels. This hand wheel control disposes with levers and other devices often used and thus eliminates liability of injury to operators' hands. Another hand wheel operates to move the head inwardly or outwardly to match the sod line whatever its distance from the rail may be. This setting can be very quickly completed without the use of tools. There are no heavy springs or levers which may fly back as a lift chain breaks. The cutter bars are held in suspension by a steel cable which passes over a drum.

The cutter bars are pivoted at a level just above the shoulder of the grade so that they can cut at an angle of fifty-five degrees below the horizontal, and therefore the machine operates as well on steep as on level grades. This is a valuable feature of the invention.

With the device herein only two men are required, one for each mowing means to manipulate said means to follow the slope and to cut, and to avoid obstructions such as guy wires and stumps which make frequent lifting of the sickle necessary, and sometimes forces the withdrawal of the head to its innermost position against the car. The device provides means whereby the cutter bars very closely follow the sides of the grade even when very steep. The adjustment can be easily made and can be safely varied to match changes in the slope while the machine is steadily moving.

When the head is extended laterally of the car and if the cutter encounters a post or other obstruction lying between the power head and the car, the power lift can be operated to pull the power head inwardly, as well as to lift the cutter bar to a substantially vertical position. This ability to quickly withdraw the cutting implement in the manner just described makes cutting closer to such obstruction, possible. In some devices, it is necessary to raise the cutter bar anywhere from one to four rods in front of the obstruction so as to be able to clear it without stopping or slowing down.

Another feature is the provision of sickle drive separate from the drive for the car so that the mower can be cutting at full speed even when the car is standing still.

Another feature of the invention is that the sickles automatically stop moving when raised to the vertical or substantially vertical position, and another feature is that means are provided whereby the cutting operation can be discontinued on either side, while the cutting operation on the other side continues. The cutting movement starts as the sickles are lowered.

The cutter bars operate smoothly when inclined downwardly ten degrees below or forty degrees above the center line of the guide arm. Cutting may be accomplished with the guide arm in any position between forty-five degrees above or below horizontal thus affording a downwardly cutting limit of approximately fifty-five degrees.

All control pedals are in duplicate, and they are all grouped in positions easily accessible by respective operators, while positioned to control sickle operation and adjustment; a feature of the invention.

In Figures 17 to 22 is illustrated a construction permitting vertical adjustment of the head. It will be understood that this construction can be substituted for that shown in the construction heretofore described, and therefore claim is made to this adjustable feature per se, and in combination with the other features of the invention.

This feature of the invention relates to a construction whereby the head can be adjusted vertically to arrange the pivotal point of the guide arm 55 with the head at distances nearer or farther from the ground, particularly in cases where the crown is at a relatively great distance from the end of the tie. The ground sometimes slants from the tie slightly downwardly and then downwardly at a more acute angle. Under these conditions when the head is adjusted to lie over the crown the distance between the pivotal point of the guide arm with the head, above the crown, is so great that no angular adjustments of the parts can be made, that is of the arm and sickle, to obtain the best results. This condition is illustrated at the right hand side of Figure 1 wherein it will be seen that the guide arm 55 is at its limit of downward movement.

Instead of forming the head of two opposed channel iron elements as previously described, the end of the beam is provided with a bracket including a hollow cylindrical vertically disposed guide portion 190 arranged terminally of the beam. Within this tubular element is slidably fitted the head proper 191 consisting of a cylindrical plunger-like element having at its bottom a head 192 in which the pitman shaft 95 is journaled, the construction being substantially the same as that previously described. At the upper end of the plunger is another head 193 which provides bearing for a pulley shaft 194. The heads are connected by uprights 195, and upon one of the uprights is mounted the latch mechanism generally indicated at 196 and corresponding functionally to that previously described. One of the angle irons 195 which connects the heads merely forms a support for this latching mechanism. The shaft of the upper head is suitably held in bearings and projects laterally and has a pulley 197 which is in the same vertical plane with pulley 198 of the pitman. In the previously described form the upper pulley shaft has two pulleys one within the frame and the other outside of it, and the power was transmitted through the pulley box to the inner pulley. In this instance, the pulleys 201—202 are arranged upon a shaft 200 at the end of the head upon the casting which supplies the socket or guide 190 for the plunger 191. A belt 199 is arranged around the three pulleys 197, 202, 198, as shown, and an idler pulley 203 is arranged under spring tension as shown. A second idler is shown at 204. Connecting the belts in this manner the plunger or head can be moved vertically while the machine is operating, and the driving connection will not be interfered with. Means is provided for raising and lowering the plunger from the tower. The cable connection with the handwheel controlled drum on the tower has not been shown, because its construction is made obvious by, for example, the shaft 57 and related elements. Three pulleys 210, 211, 212 are used for guiding the adjusting cable 216 and the end of the cable is attached as at 213 to the bottom of the head as shown, passes upwardly over that pulley 212 carried by the head of the beam, thence downwardly around the pulley 211 arranged at the bottom of the head and then upwardly in a groove 214 of a rack 215 to the upper pulley 210, thence inwardly in direction of adjustment of the beam toward the control tower. The rack acts as a spline to prevent rotation of the element 191 in its guide, see Figure 19.

In order to secure the head in its adjusted position a pawl and ratchet means is provided. For this purpose a pawl 220 is pivoted on shaft 221, see Figures 21—22. The teeth of the rack 215 are so related that the pawl falls by gravity towards the teeth of the rack and engages them to prevent downward movement of the element 191. It will also be noted that the control cable pulley 210 lies between the arms of the yoke-shaped pawl. Thus, if it is desired to raise the plunger the pawl merely moves in the manner of a ratchet permitting such upward movement.

When it is desired to lower the head 191, the pawl can be manually released, after the cable has been drawn to slightly lift the head. However, in raising as when avoiding an obstruction, the pawl acts automatically to secure the head in its upwardly-adjusted position. It is, of course, conceivable that a simple mechanism can be provided to automatically release the pawl to permit lowering, instead of manually releasing the pawl as in the present case. Such an automatic releasing mechanism is contemplated.

I claim as my invention:

1. A device of the class described comprising a wheeled truck, an arm arranged to be extended laterally beyond the truck, a second arm and a pivot swingingly connecting it to the first arm, a cutter swingable upon the second arm, means for driving the cutter including a crank journaled on said laterally extending arm, in co-axial relation to the pivot, and a pitman connecting with the terminal of the cutter and adapted to lie substantially within the plane of the second arm for all operative positions of the arm.

2. A device of the class described comprising a wheeled truck, an arm arranged to be extended laterally beyond the truck, a second arm swingable upon the first, a cutter swingable upon the second arm, means for driving the cutter including a belt, and means for tensioning the belt, said tensioning means being mounted to move in direction of extension of said laterally extendable arm, and means for securing said tensioning means to prevent movement toward the side of the truck.

3. In combination with a car, an element adjustable transversely of the car to extend therebyond and having a bearing and crank shaft therein, an arm swingable upon the bearing in a vertical plane, a cutter swingable upon the arm in a vertical plane, and means connecting the crank shaft for driving the cutter.

4. A wheeled vehicle, an element slidably mounted thereon and adapted to be adjusted transversely to project therebeyond, a frame and means pivoting it to said slidably adjustable element to swing vertically, a drive shaft co-axial with said pivoting means, a sickle pivoted to said frame and adapted to swing vertically, and means connecting said shaft to operate the sickle.

5. In combination a mower truck having mowing means extending laterally of the truck, and means for operating said means, a hauling truck including driving means, and a coupling connection between the trucks and means by which it is adapted to automatically uncouple when the cutting instrumentalities engage an obstruction during movement of the trucks, means for adjusting the mowing means and braking means for the mower truck adapted to be operable by attendants while positioned to control the mower operating and mower adjusting means.

6. In combination a mower truck, and a hauling truck including driving means, said mower truck having cutting means thereon including cutter bars having teeth faced in the direction of the hauling unit, means coupling said trucks and means by which said means is adapted to be automatically uncoupled when the cutting means engage a relatively immovable construction, means for adjusting the cutting means, and braking means for the mower truck positioned to be operated by an attendant when positioned to control operation and adjusting of the cutting means, and cause the trucks to be uncoupled when the cutting means cannot be moved quickly enough to avoid an obstruction.

7. A wheeled vehicle, an element slidably mounted thereon and adapted to be adjusted transversely of the vehicle and to project laterally therebeyond, a frame pivoted to said slidably adjustable element at a point laterally of the vehicle and terminally of said element, to swing vertically, a sickle pivoted to said frame laterally of the pivotal point of said frame with said slidably adjustable element, and to swing vertically, a belt drive and connections for operating the sickle through said slidable element and frame, a belt tightener slidable in the same direction as said slidably adjustable element and having means for securing it in adjusted positions against movement in direction of said frame and sickle, means operable from said vehicle for separately adjusting said sliding member, and additional means for respectively separately adjusting said frame and sickle about their pivotal axes.

8. A device of the class described comprising a truck, means upon the truck mounted to be adjusted to extend laterally therebeyond and cutting means pivoted to said laterally adjustable means arranged to be angularly adjusted in a vertical plane, an idler box slidable in direction of adjustment of said laterally extensible means, and a belt drive for said cutting means which includes pulleys carried by said idler box.

9. A device of the class described comprising a truck, means upon the truck mounted to be adjusted to extend laterally therebeyond, cutting means pivoted to said laterally adjustable means arranged to be angularly adjusted in a vertical plane, an idler box slidable with respect to said adjustable means in direction of its adjustment, a belt drive for said cutting means which includes pulleys carried by said idler box and means adjustable for securing said idler box in adjusted positions.

10. In combination with a truck of the type described an element slidably mounted thereon and adapted to be projected laterally thereof, a drive shaft upon said element, a frame pivoted on an extension of said drive shaft to swing vertically, a sickle including a shoe pivoted to said frame also to swing vertically, means connecting said drive shaft to operate the sickle, a belt drive for said drive shaft including a belt-tightener slidably guided and having means for securing it in adjusted positions.

11. In combination with a truck of the type described an element slidably mounted thereon and adapted to be projected laterally thereof, a drive shaft upon said element, a frame pivoted on an extension of said drive shaft to swing vertically, a sickle including a shoe pivoted to said frame also to swing vertically, means connecting said drive shaft to operate the sickle, a belt drive for said drive shaft, and a belt-tightener slidable in the same direction as said laterally adjustable element, and having means for securing it in adjusted positions.

12. In combination with a truck of the type described an element slidably mounted thereon and adapted to be projected laterally thereof, a drive shaft upon said element, a frame pivoted on an extension of said drive shaft to swing vertically, a sickle including a shoe pivoted to said frame also to swing vertically, means connecting said drive shaft to operate the sickle, the connection with the sickle being adjacent the pivotal point of the shoe with the frame, a belt drive for said drive shaft, and a belt-tightener slidable in the same direction as said laterally adjustable element, said tightener having means for securing it in adjusted positions against movement in direction toward said drive shaft.

13. A device of the class described including a mower truck having mowing means thereon, motive means for driving said mowing means, a power truck having driving means, and a coupling connection between the trucks including means adapted to uncouple the trucks if the mowing means engage an obstacle during movement of the trucks.

14. A truck for the purpose described having mowing means thereon, said means including a mower blade extending laterally of the truck, a power truck having driving means, and a coupling connection between the trucks including means adapted to automatically uncouple when the mower blade forcibly engages an obstacle in predetermined degree, during movement of the trucks.

15. A device of the class described comprising a truck having mowing means mounted thereon including a cutting element which extends laterally of the truck and which has teeth facing in direction of travel of the truck, a jack arranged adjacent the center of mass of the truck, and including a movable element about which the truck can swing, and power means for projecting the movable element to lift the truck, whereby the truck and mowing means as a unit can be raised and the truck swung to dispose the teeth for operation by a movement of the car in the opposite direction.

16. A device of the class described comprising a truck having mowing means mounted thereon including cutting elements which extend laterally of the truck and which have teeth facing in direction of travel of the truck, a jack arranged adjacent the center of mass of the truck, and including a movable element about which the truck can swing, and power means for projecting the movable element to lift the truck, said power means being accessible from the top of the truck, whereby the truck and mowing means as a unit can be raised and the truck swung to dispose the cutters for operation by a movement of the car in the opposite direction.

17. A device of the class described including a railroad car, an arm adjustable to extend laterally of the car, an arm swingable at the end of the first mentioned arm, a cutter swingable upon the second arm, means for driving said cutter including a belt and pulley therefor mounted upon the first arm, means for tensioning the belt, and means connecting the tensioning means with the second arm to relieve tension on the belt when the arm is raised.

18. A device of the class described including a railroad car, an arm adjustable to extend laterally of the car, an arm swingable at the end of the first mentioned arm, a cutter swingable upon the second arm, means for driving said cutter including a belt, tensioning means for said belt, means connecting said tensioning means with said second arm in a manner to relieve tension on the belt when the arm is raised, and means for adjusting the second arm and cutter.

19. A device of the class described including a railroad car, an arm adjustable to extend laterally of the car, an arm swingable at the end of the first mentioned arm in a vertical plane, a cutter swingable upon the second arm substantially terminally thereof in a vertical plane, means for driving said cutter including belts and pulleys mounted upon the first arm, one of the belts having a tensioning means, means yieldably connecting said tensioning means with said second arm in a manner to relieve tension on the belt when the arm is raised, and means for separately adjusting each arm and cutter, and means for releasably locking the second arm in raised position adjacent the first.

20. A device of the class described comprising a wheeled truck, mowing means extending laterally of the truck and including a pivoted arm and a mower pivoted to that arm, means for driving the mower, and means for separately adjusting the arm and mower including mechanism for adjusting the arm, both manually and by power.

21. A device of the class described comprising a wheeled truck, an arm arranged to extend laterally beyond the truck, a second arm swingable upon the first, a cutter swingable upon the second arm, means for driving the cutter, means for adjusting the cutter, means for latching the second arm to the first in raised position and a pivoted arm movable with said cutter and adapted to adjust the cutter and trip the latch.

22. A device of the class described including a wheeled truck, an arm adjustable to extend laterally of the truck, a second arm swingably attached to the first, cutters swingable upon the second arm, means for driving the cutter including belts, pulleys mounted upon the first arm, one of the belts having tensioning means, means yieldably connecting said tensioning means with said second arm in a manner to relieve tension on the belt when the arm is raised, and means for separately adjusting each arm and cutter.

23. A device of the class described including a wheeled truck, an arm adjustable to extend laterally of the truck, a second arm swingably attached to the first, cutters swingable upon the second arm, means for driving the cutter including belts and pulleys mounted upon the first arm, and latch means on the first and second arms cooperable for releasably locking the second arm in raised position adjacent the first arm.

24. A device of the class described comprising a truck, an arm arranged to extend laterally beyond the truck, a head on the arm vertically adjustable, a second arm, pivoting means swingably connecting the second arm to the head, a cutter swingable upon the second arm and means for driving the cutter including a crank shaft co-axial with the pivoting means, and a pitman connecting said crank terminally of the cutter.

25. A device of the class described comprising a truck, an arm arranged to extend laterally beyond the truck, a head on the arm vertically adjustable a second arm, a pivoting means swingingly connecting the second arm to the head, a cutter, pivoting means swingingly connecting the cutter to the second arm, and means for driving the cutter including a crank shaft co-axial with the first mentioned pivoting means, and a pitman connecting said crank with the cutter at a point substantially co-axial with its pivoting means.

26. A device of the class described comprising a truck, and an arm arranged to be extended laterally beyond the truck, said arm having a head, means for vertically adjusting the head upon the arm, a second arm swingable upon the head, a cutter swingable upon the second arm, means for driving the cutter, means for separately adjusting arm, head and cutter, said cutter driving means including a belt and means for tensioning the belt, and said tension means being mounted to move in direction of extension of said laterally extendable arm.

27. A device of the class described comprising a truck, an arm arranged to be adjusted laterally beyond the truck, a frame pivoted to the arm for vertical motion, mowing mechanism swingable upon said frame, and means for driving said mechanism including a pitman connection with the mowing mechanism, which connection lies substantially within the plane of said frame for all operative positions.

28. A device of the class described comprising a truck, a horizontal arm arranged to be adjusted laterally beyond the truck, a frame pivoted to the arm for vertical motion, mowing mechanism and means pivoting it to the frame, and means for driving said mechanism including a pitman connection with the end of the mower blade substantially immediately adjacent said pivoting means.

29. A device of the class described comprising a truck, an arm arranged to be adjusted laterally beyond the truck and having a vertical bore, a plunger slidable in said bore, a frame and means pivoting it to the bottom of the plunger, a mowing mechanism swingable upon the frame, and driving means for the mowing mechanism.

30. A device of the class described comprising a wheeled truck, power means thereon, an arm adjustably arranged upon the truck to be extended laterally beyond the truck independently of the power means, a second arm swingable upon the first, a mowing mechanism swingable upon the second arm, and means for driving the mowing mechanism including a slack belt, and pulley means adjustable in direction of extension of the arm to maintain belt tension and adjust belt length conformably to arm adjustment.

31. A device of the class described including a railroad car, an arm which is adjustable to extend laterally of the car, a head vertically adjustable at the extremity of the arm, and having spaced bearings at its lower extremity, a frame swingable on said bearings, a cutter and means pivotally connecting it to the extremity of the frame, and means for driving the cutter including pulleys carried by the arm and the head, a crank shaft journaled in said bearings, and having a crank therebetween and a pitman connecting the crank with the cutter.

In witness whereof, I have hereunto set my hand this 9th day of March, 1929.

WILLIAM R. WALTERS.